(12) United States Patent
Morard

(10) Patent No.: US 9,729,931 B2
(45) Date of Patent: Aug. 8, 2017

(54) SYSTEM FOR MANAGING DETECTION OF ADVERTISEMENTS IN AN ELECTRONIC DEVICE, FOR EXAMPLE IN A DIGITAL TV DECODER

(75) Inventor: Jean-Pierre Morard, Rueil-Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 0 days.

(21) Appl. No.: 13/574,275

(22) PCT Filed: Dec. 31, 2010

(86) PCT No.: PCT/EP2010/070953
§ 371 (c)(1),
(2), (4) Date: Jul. 20, 2012

(87) PCT Pub. No.: WO2011/088962
PCT Pub. Date: Jul. 28, 2011

(65) Prior Publication Data
US 2012/0300127 A1 Nov. 29, 2012

(30) Foreign Application Priority Data
Jan. 21, 2010 (FR) ...................................... 10 50404

(51) Int. Cl.
*H04N 21/472* (2011.01)
(52) U.S. Cl.
CPC .............................. *H04N 21/47202* (2013.01)
(58) Field of Classification Search
CPC ........... H04N 21/4622; H04N 21/4782; H04N 21/8456; H04N 21/47202; H04N 21/8549; H04N 21/26233; H04N 21/44012; H04N 19/40; H04N 21/234309; H04N 19/132
See application file for complete search history.

(56) References Cited

U.S. PATENT DOCUMENTS

| 7,050,586 B1 * | 5/2006 | Shamoon ...................... 380/232 |
| 2001/0025297 A1 * | 9/2001 | Kim ................. H04N 21/23412 709/203 |
| 2002/0174010 A1 * | 11/2002 | Rice, III ........................ 705/14 |

(Continued)

OTHER PUBLICATIONS

International Search Report as issued for PCT/EP2010/070953.

*Primary Examiner* — Nathan Flynn
*Assistant Examiner* — Cynthia Fogg
(74) *Attorney, Agent, or Firm* — Pillsbury Winthrop Shaw Pittman LLP

(57) ABSTRACT

A method for displaying multimedia content on the screen of a multimedia terminal, the multimedia content being encoded by data included in a file stored on a server remote from the terminal in a format such that the entire file is required by an application supporting the format for generating a display of the multimedia content on the screen of the terminal, wherein the method includes: requesting by the terminal the transmission of an encoding of the display of the multimedia content into a defined rendering format; using by the server the file for generating the rendering encoding of the multimedia content according to the defined rendering format by the terminal; and transmitting by the server the rendering encoding to the terminal using a graphic interface sharing protocol.

16 Claims, 2 Drawing Sheets

(56) References Cited

U.S. PATENT DOCUMENTS

| | | | |
|---|---|---|---|
| 2003/0081836 A1* | 5/2003 | Averbuch | G06K 9/38 382/199 |
| 2003/0106022 A1* | 6/2003 | Goodacre et al. | 715/513 |
| 2004/0103438 A1* | 5/2004 | Yan | H04L 29/06027 725/109 |
| 2004/0194143 A1* | 9/2004 | Hirose | 725/97 |
| 2005/0185102 A1 | 8/2005 | Fairhurst | |
| 2005/0246752 A1* | 11/2005 | Liwerant et al. | 725/109 |
| 2006/0015580 A1* | 1/2006 | Gabriel et al. | 709/219 |
| 2006/0245490 A1* | 11/2006 | Yoshizawa | H04N 7/17318 375/240.01 |
| 2006/0256130 A1* | 11/2006 | Gonzalez | 345/619 |
| 2007/0177632 A1* | 8/2007 | Oz et al. | 370/486 |
| 2008/0163316 A1* | 7/2008 | Liwerant et al. | 725/98 |
| 2008/0201748 A1* | 8/2008 | Hasek et al. | 725/98 |
| 2009/0034784 A1* | 2/2009 | McQuaide, Jr. | 382/100 |
| 2009/0167774 A1* | 7/2009 | Want et al. | 345/543 |
| 2009/0254672 A1* | 10/2009 | Zhang | H04N 21/23106 709/231 |
| 2009/0320068 A1* | 12/2009 | Chen | 725/39 |
| 2010/0124272 A1* | 5/2010 | Fein et al. | 375/240.01 |
| 2010/0146442 A1* | 6/2010 | Nagasaka | G06Q 10/10 715/810 |
| 2010/0281042 A1* | 11/2010 | Windes | H04N 7/17327 707/756 |
| 2010/0325674 A1* | 12/2010 | Liu | 725/92 |
| 2011/0179106 A1* | 7/2011 | Hulse | G06F 9/4443 709/203 |
| 2012/0236199 A1* | 9/2012 | Imai | H04N 19/507 348/415.1 |

* cited by examiner

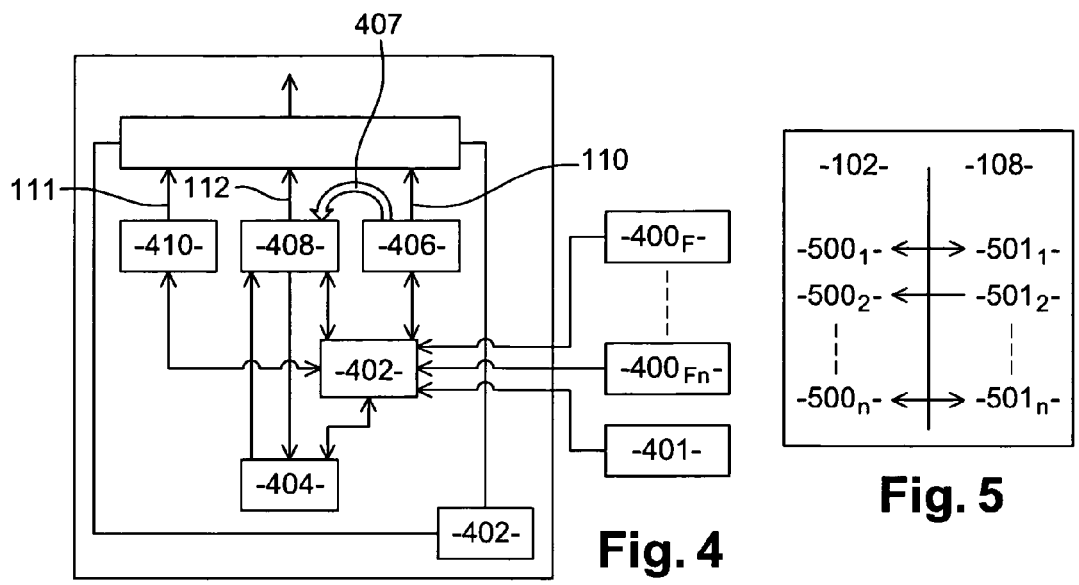
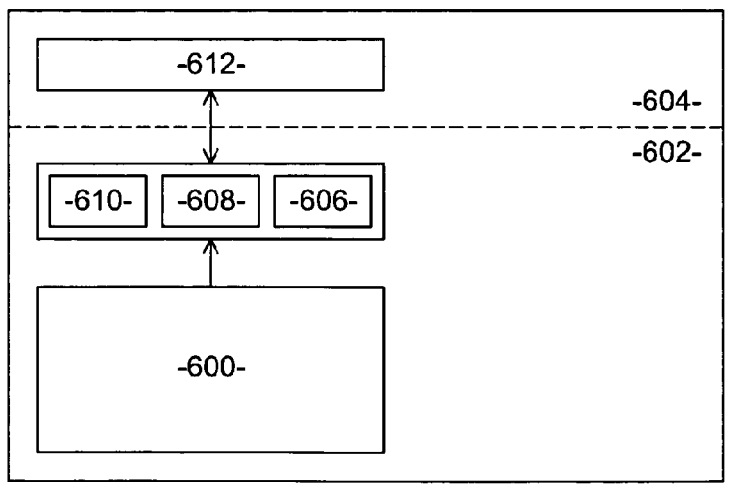
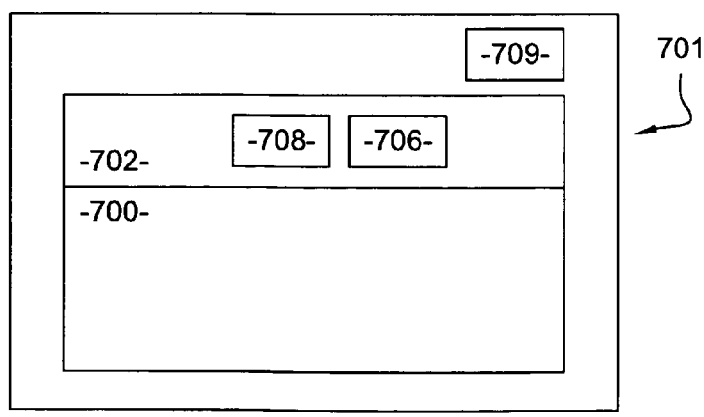

SYSTEM FOR MANAGING DETECTION OF ADVERTISEMENTS IN AN ELECTRONIC DEVICE, FOR EXAMPLE IN A DIGITAL TV DECODER

CROSS REFERENCE TO RELATED APPLICATIONS

This application is the U.S. National Stage of PCT/EP2010/070953, filed Dec. 31, 2010, which in turn claims priority to French Patent Application No. 1050404, filed Jan. 21, 2010, the entire contents of all applications are incorporated herein by reference in their entireties.

TECHNICAL FIELD OF THE INVENTION

The present invention relates to a method for displaying multimedia content on a screen of a terminal.

TECHNOLOGICAL BACKGROUND OF THE INVENTION

The development of telecommunications networks has increased the number of documents, or files, stored in servers connected to networks and may be consulted by a remote user via his terminal.

Therefore users equipped with terminals associated with screens may see much multimedia content such as Web pages or videos. For this purpose, these terminals may be fixed—such as a decoder associated with a television—or mobile—such as a portable telephone—and connected to one or more types of telecommunications networks such as the Internet network or 3G cellular network.

It appears that access to remote contents presents the disadvantage of turning out to be tedious, or even difficult, when this access requires that much information be consulted before finding the desired content and/or implementing the transmission of a large file even though the desired content represents a minority part of this file.

By way of example, a user wishing to consult a telephone directory to obtain the telephone number of an individual may be forced to download the entire directory, with thousands of entries, if this directory is coded in a format—for example of the PDF™, JPEG 2000™ or MsWord™ type—that does not enable the partial transmission of this file and, in particular, the part comprising the desired content.

GENERAL DESCRIPTION OF THE INVENTION

In this context, the present invention aims to resolve this disadvantage by proposing a method that enables a user to access part of a multimedia content without requiring the transmission of the entire file coding this content. This results from the observation according to which a graphic sharing protocol, of the RUI "Remote User Interface" type, may enable a server to transmit the display of a multimedia content in the form of an image and, conversely, to receive commands from the terminal.

This is why the present invention relates to a method for rendering multimedia content on the screen of a multimedia terminal, this multimedia content being coded by data included in a file, stored on a server remote from said terminal, in a format such that the entire file is required by an application processing this format for generating a display of said multimedia content on a screen of the terminal, characterized in that the method comprises the following steps:

the step for the terminal of requesting the transmission of an encoding of the display of the multimedia content in a defined rendering format;
the step for the server of using the file to generate the rendering encoding of said multimedia content according to the rendering format defined by the terminal, and
the step for the server of transmitting the encoding of this rendering to the terminal by means of a graphic interface sharing protocol.

Thanks to the invention, a terminal wishing to display a multimedia content does not need to receive or process the entire file comprising the encoding of the multimedia content, since only the desired rendering encoding, i.e., the display, is transmitted by the remote server.

Consequently, the transmission of multimedia content requires a particularly reduced quantity of data and, consequently, an access cost that is also reduced, particularly in relation to time, compared to a transmission according to the prior art, i.e., comprising the entire file.

In one embodiment, the method comprises the additional step for the terminal of storing different defined rendering formats for different applications processing different file formats.

According to one embodiment, the method comprises the additional step for the terminal of displaying command buttons on a screen and associating the command of such a button with the transmission of a command to the server intended to control the use of the file by the server.

In one embodiment, the method comprises the transmission of a command to the server by the terminal coded according to a graphic interface sharing protocol.

According to the embodiment, the multimedia content comprising a video, the server transmits the rendering encoding of the video by means, first, of data data encoding the position of the video according to the defined rendering format and, second, the video data encoding the images forming the video.

In one embodiment, the data data and the video data are generated from the same memory storing the rendering encoding of multimedia content generated by the server according to a matrix encoding.

According to an embodiment, the method comprises the additional step of processing data data generated to inhibit the transmission of video data.

In one embodiment, the defined display format determines the size of the rendering dedicated by the terminal on its screen to the multimedia content.

The invention also relates to a server storing multimedia content in a file, coded in a format such that the entire file is required by an application processing this format to generate a rendering of said multimedia content on a screen, characterized in that it comprises:

means for receiving a transmission request of an encoding of the display of the multimedia content in a defined rendering format transmitted by a remote terminal;
means for using the file stored to generate the rendering encoding of said multimedia content according to the defined rendering format by the terminal, and
means to transmit the encoding of this rendering to the terminal by means of a graphic interface sharing protocol so as to participate in the implementation of a method in conformance with one of the previous embodiments.

The invention also relates to a terminal comprising means to render multimedia content on the screen, this multimedia content being coded by data included in a file, stored on a server remote from said terminal, in a format such that the entire file is required by an application processing this format for generating a rendering of said multimedia content on a screen of the terminal, characterized in that it comprises means to request the transmission of a rendering encoding of the multimedia content according to a defined rendering format so as to implement a method according to one of the previous embodiments.

BRIEF DESCRIPTION OF THE FIGURES

Other characteristics and advantages of the invention will clearly emerge from the description given below, for indicative and in no way limiting purposes, with reference to the attached figures in which:

FIG. 4 represents, by means of flowchart blocks, a structure of a server in conformance with the invention, FIG. 5 represents a display format table that may be implemented by a terminal in conformance with the invention, FIG. 6 represents, by means of flowchart blocks, a structure of a server in conformance with the invention, and FIG. 7 represents the structure of a display screen of a terminal implementing the invention.

DESCRIPTION OF PREFERRED FORMS OF EMBODIMENT OF THE INVENTION

Figure 1:
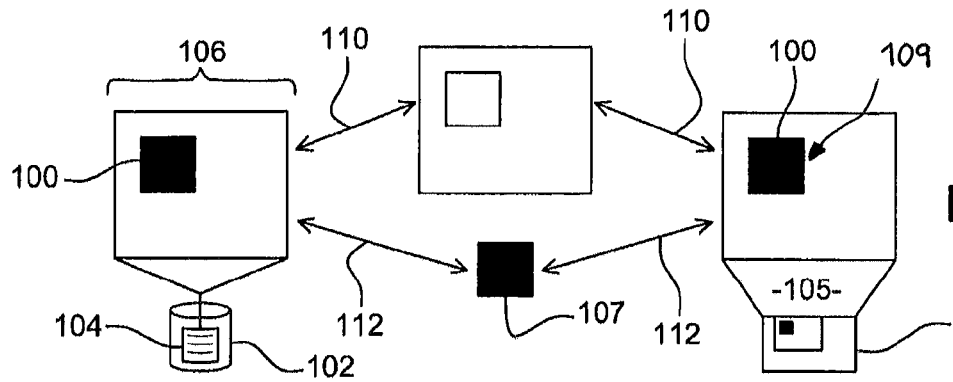
FIGS. 1, 2 and 3 schematically represent steps of operations performed by a server and/or a terminal implementing the invention.

FIG. 1 represents a method of transmitting multimedia content 100 in conformance with the invention. For this purpose, this method implements a server 102 storing a multimedia file 104 being implemented, by an application specific to the file format 104, to enable a rendering, hereafter named a display, of said multimedia content 100 on a multimedia screen 105 of a terminal 108 remote from said server 102.

In order to transmit this multimedia content 100 to the remote terminal 108 without transmitting the entire file 104, the storage server 102 executes the multimedia file 104 to obtain an encoding of a display 106 of said multimedia content 100, which enables the transmission of the multimedia content 100 by means of a graphic interface sharing protocol and an audio and video data packet transmission, or "streaming," protocol, to terminal 108.

In other words, terminal 108 may receive said multimedia content 100, in a display format previously sent to the server 102, without requiring the transmission of the entire file 104.

When the multimedia content 100 comprises a video, at least two implementations of the invention may be used:
- A first implementation according to which terminal 108 may render—display—this video directly from the compressed video stream, for example by a mechanism of software called "hooks" in the Windows™ operating system,
- A second implementation according to which terminal 108 cannot render—display—this video directly from the compressed video stream.

In the latter case, considering that the displayed image of the multimedia content 100 varies with time, the transmission of the multimedia content is performed along two channels, i.e., a first channel 110 dedicated to the transmission of data data, or a man/machine interface relative to, for example, the position of the multimedia content 100 on display screen 105 of terminal 108—and, on the other hand, video data 112 transmitting displayed images—for example by encoding the color and brightness of the pixels forming the images.

Therefore, terminal 108 may, first, receive the video and, second, locate this video on a screen according to a PIP "Picture in Picture" method, according to which the image 107 transmitted is merged in the indicated location 109 of screen 105 of terminal 108.

As described subsequently by using FIG. 4, in this case video content, the data channel 110 is connected to the video channel 112 such that one may inhibit the transmission of video data along channel 110 and, therefore, prevent transmission redundancy.

Figure 2:
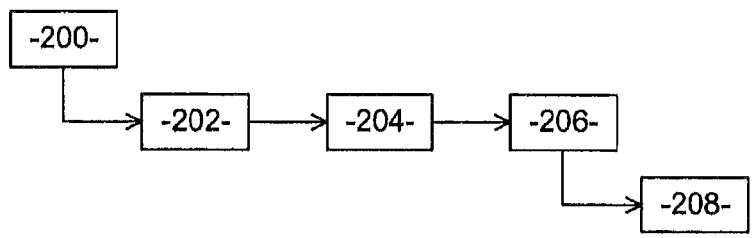

In general, a method in conformance with the invention implementing a video content 100 implements the 5 steps detailed in FIG. 2 to transmit data along the video channel 112, i.e.:

A first step 200 to detect a video in display 106 generated by executing file 104. For this purpose, it is possible to modify the application generating the video content so that it transmits a detection signal or, alternatively, manages a master application—such as Windows™ "hooks"—that obtains information on file access by an application in a server and on the rendering window of this application, which thus detects the implementation of a video.

Finally, it should be noted that, in a variation, it is also possible to detect display zones 106 of a video (the name of the rendering window indicating that it is a video player) or what is identified as a video (frequently modified zone that, statistically, may be regarded as video reproduction zones).

A second step 202 of recovering videos in the display 106 generated by executing file 104. Different methods may be implemented during this step but, in general, one may distinguish, first, between recoveries performed without the server decoding the file 104 and, second, recoveries performed after the server 102 has decoded the file 104, as detailed below:

i) During recovery 202 without decoding, a detection 200 should be implemented that transmits the location of the multimedia content 100 encoding in file 104 in order to enable the transmission of the multimedia content 100 encoding.

In addition, this detection 200 must detect the zone where the multimedia content is displayed as well as its status—stop, pause, read, fast, for example by means of Windows™ hooks that capture events sent by the application to an operating system that then plays a "middleware" role, particularly the abstraction and management of sharing system resources between different applications.

ii) During recovery 202 after decoding, the addresses of the multimedia content encoding locations may be obtained in the form of addresses in a graphics card reproducing the multimedia content 100.

A third step 204 of encoding content 100 displays recovered in a format enabling the reproduction of these contents 100 like a video, such as the H264 format.

A fourth step 206 of transmitting the file via the telecommunications network under consideration and a fifth step 208 of processing by terminal 108.

In parallel with these operations carried out on the video channel, different steps are implemented in the data channel 110, for example by using the RFB protocol as described in the document "The RFB Protocol," by Tristan Richardson, Real VNC Ltd, version 3.8, updated on 26 Feb. 2009 (http://www.realvnc.com).

According to such a protocol, terminal 108, also called the RFB terminal or client terminal, may display a multimedia content 100 generated by the remote server 102, the latter hosting hardware means—components—and software means—software—to determine this multimedia content 100 according to commands transmitted by terminal 108 as described subsequently.

Indeed, the RFB protocol is characterized by the use of simple graphics instructions such as a command to display a rectangle of pixels of data at a given position (x, y) of the screen.

Each image formed by the RFB server is stored in a buffer memory—known as a "framebuffer" of the server 102, generally coded in RGB (Red Green Blue) format, that constitutes the most direct way to code images, the three planes corresponding to the three primary colors red, green and blue.

Figure 3:
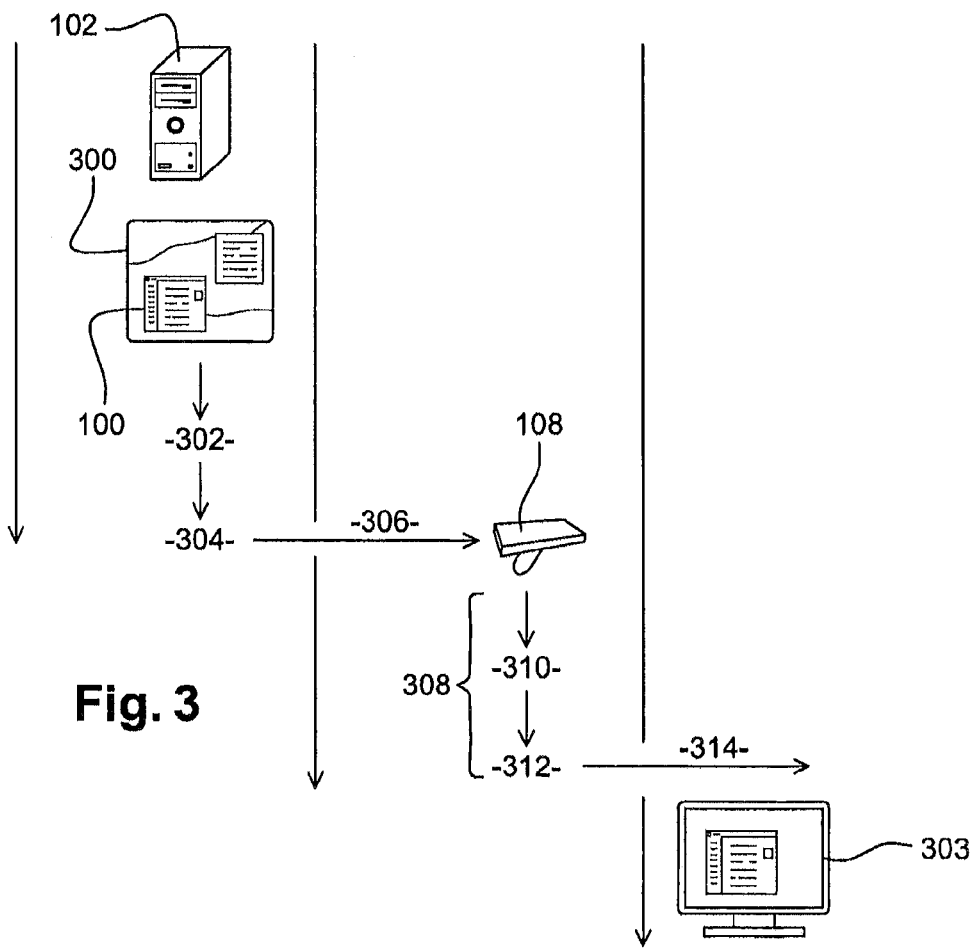

This is why, according to a first step 300 (FIG. 3), server 102 performs a screenshot in the RGB format that enables the display of the content 100 to be obtained.

According to a second step 302, the data coded according to the RGB format are advantageously converted to the YUV format that operates data compression with a loss that is barely detectable by the human vision system and that also is the usual format supported by a video encoder) and then are encoded (step 304) and transmitted (step 306) according to the H264 format encapsulated in the RFB protocol.

Because of this, step 308 of processing data received by terminal 108—in this instance a decoder associated with a television 303—comprises operations 310 of decapsulating data coded according to the RFB protocol, decoding 312 the image according to the H264 protocol and then fusing 314 the decoded image with the image from the screen in order to enable its transmission to the display device 303.

FIG. 4 represents different functional elements of a server 102 implementing the server steps such as previously described:

More precisely, such a server 102 is associated with a plurality of applications $400_F$. to $400_{Fn}$, each of these applications may execute different distinct file formats F to Fn so as to obtain the encoding of the display of the required application.

In addition, server 102 comprises an application manager 402 that may command this application in relation to a file, and for a display size, required and defined by a terminal.

For example, if server 102 must execute a file in the ".pdf" format, the manager 402 commands an application $400_{pdf}$ supporting this format in order to obtain the encoding of the display of a file, in PDF format, in relation to a required display size.

In general, when terminal 108 requests the transmission of a multimedia content contained in a file in I format, manager 402 may command the application $400_i$ required to execute this file and obtain the display encoding of the multimedia content in a random access memory, or "Framebuffer," 404.

From this encoding in the random access memory 404, the manager 402 may generate a stream 112 of video data, transmitted by a video module 406, and a stream 110 of data data, transmitted by a data module 408.

As already described, the data stream 110 transmits parameters enabling the image to be located on the screen of the terminal but must be inhibited to prevent a double transmission of video data.

This is why module 406 inhibits module 408—operation 407—so that the latter does not transmit video data issued from the random access memory 404.

Server 102 also comprises an audio module 410 generating an audio stream 111. However, when the compressed video stream is captured on the server, this audio module is not implemented since the video module 406 may also process the audio stream like, for example, in the MPEG "Motion Picture Expert Group" format, the audio stream then being combined with the video stream prior to their transmission via an IP "Internet Protocol" interface.

These audio 111 and video 112 streams relate to raw, or "RAW" data corresponding to the audio/video stream generated from the Framebuffer while the data channel transmits MMI events and the rendering plane.

Finally, it should be noted that server 102 is, in this embodiment, a server specifically dedicated to obtaining the display encoding of a multimedia content.

Therefore, server 102 requests from remote server 401, dedicated to storing the required file, the transmission of the latter in order to obtain the display encoding.

With reference to FIG. 6, the operation of terminal 108 is represented by means of its hardware components 600 that are controlled, in the space of the operating system 602, by drivers, or dedicated software, 606 (data stream), 608 (video stream) and 610 (audio stream).

These drivers enable the extraction of data relative to the position of the display on the screen of the terminal and to the processing of data entered by the user via an interface displayed on the screen and controlled by an application 612 present in the user space 604.

This user space 604 is controlled from the display on screen 701 (FIG. 7) that is divided into three zones, i.e.:

a first zone 700, also subsequently called the file rendering window whose dimensions correspond to those of the window coded by the storage server in its "Framebuffer" memory, a second zone 702 equipped with command buttons 708 and 706 in a Google™ Toolbar type bar displaying functions that may correspond to commands for the file rendering application of the server.

For example, a button 704 command displayed as "save folder" may correspond to a procedure, at the server 102 level, equivalent to pressing the "ALT"-"S" keys that generates said saving function.

A third zone comprising an address, for example a URL 709, enabling messages to be sent to the terminal.

Indeed, as shown in FIG. 5, a correspondence table between events, i.e., commands $500_1$, $500_2$, ... $500_n$ in the execution of a server-side file, and signals $501_1$, $501_2$, ... $501_n$ transmitted by the terminal may enable the latter to command, via a graphics interface, events $500_1$, $500_2$, ... $500_n$.

It should be noted that the description above implements a digital decoder but the invention may be implemented with any type of terminal comprising video decoding capabilities, such as a computer, Web tablet or cellular telephone.

The present invention is open to many variations. For example, an RFB terminal may present several data capture tools—keyboards or mouse devices for example—associated with one or more monitors that may be local—directly connected to the server—or remote—indirectly connected to the server via an Internet type network.

In addition, the RFB server may also be an RFB terminal such that it shares, commonly or virtually, its resources with other terminals.

In addition, depending on variations, the user terminal may be fixed—like a digital decoder associated with a television—or mobile—like a cellular telephone, a portable computer or a Web tablet.

The invention claimed is:

1. A method for displaying multimedia content on a screen of a multimedia terminal, the multimedia content being coded by data included in a file stored on a server remote from said terminal in a first format such that the entire file is required by an application that processes said first format to generate a display of said multimedia content on the multimedia terminal screen, the method comprising:
   requesting, by the multimedia terminal, a transmission of an encoding of the display of a desired portion of the multimedia content in a defined rendering format that is different from said first format;
   selecting, by the server, a specific application from among a plurality of different applications associated with said server that is compatible with the rendering format defined by the multimedia terminal, in which each of said plurality of different applications is associated with a different rendering format;
   processing, by the server, the file with said specific application to generate the rendering encoding of said multimedia content according to the rendering format defined by the multimedia terminal, in which said rendering format defined by the multimedia terminal enables the display of only the desired portion of said multimedia content on the multimedia terminal screen without requiring a transmission from said server to said multimedia terminal of the entire file coding said multimedia content; and
   transmitting, by the server, the encoding of the rendering to the multimedia terminal using a Remote Frame Buffer protocol so that the desired portion of the multimedia content is accessed and displayed by the multimedia terminal.

2. The method according to claim 1, comprising storing by the multimedia terminal different defined rendering formats for different applications processing different file formats.

3. The method according to claim 2, comprising displaying, by the multimedia terminal, command buttons on a screen and associating a command of such a button with a transmission of a command to the server intended to control the use of the file by the server.

4. The method according to claim 3, wherein the transmission of a command to the server by the multimedia terminal is coded according to the Remote Frame Buffer protocol.

5. The method according to claim 1, wherein the multimedia content is a video, the method comprising transmitting by the server the rendering encoding of the video using, first, position data encoding a position of the video according to the defined rendering format and, second, the video data encoding the images forming the video.

6. The method according to claim 5, wherein the position and the video data are generated from a same memory storing the rendering encoding of multimedia content generated by the server according to a matrix encoding.

7. The method according to claim 5, comprising processing the position data generated to inhibit the transmission of video data.

8. The method according to claim 1, wherein the defined display format determines a size of the rendering dictated by the multimedia terminal on the screen to the multimedia content.

9. A server configured to store multimedia content in a file, said multimedia content to be displayed on a screen of a multimedia terminal, the multimedia content being coded by data included in the file stored on the server remote from said terminal in a first format such that the entire file is required by an application that processes said first format to generate a display of said multimedia content on the multimedia terminal screen, the server comprising:
   a receiver configured to receive a transmission request, transmitted by the multimedia terminal, of an encoding of the display of a desired portion of the multimedia content in a defined rendering format that is different from said first format,
   wherein the server is configured to select a specific application from among a plurality of different applications associated with said server that is compatible with the rendering format defined by the multimedia terminal, in which each of said plurality of different applications is associated with a different rendering format,
   an application manager configured to process the file with said specific application to generate the rendering encoding of said multimedia content according to the rendering format defined by the multimedia terminal, in which said rendering format defined by the multimedia terminal enables the display of only the desired portion of said multimedia content on the multimedia terminal screen without requiring a transmission from said server to said multimedia terminal of the entire file coding said multimedia content, and
   a transmitter configured to transmit the encoding of the rendering to the multimedia terminal using a Remote Frame Buffer protocol so that the desired portion of the multimedia content is accessed and displayed by the multimedia terminal.

10. A terminal comprising:
   a screen for displaying multimedia content, the multimedia content being coded by data included in a file stored on a server remote from said terminal in a first format such that the entire file is required by an application that processes said first format to generate a display of said multimedia content on the screen;
   a system configured to request a transmission by the server of an encoding of the display of a desired portion of the multimedia content in a defined rendering format that is different from said first format so that, subsequent to said request, the server is configured to
      select a specific application from among a plurality of different applications associated with said server that is compatible with the rendering format defined by the terminal, in which each of said plurality of different applications is associated with a different rendering format, and
      process the file with said specific application to generate the rendering encoding of said multimedia content according to the rendering format defined by the terminal, in which said rendering format defined by the terminal enables the display of only the desired portion of said multimedia content on the screen without requiring a transmission from said server to said terminal of the entire file coding said multimedia content, and
   a rendering system configured to display the desired portion of the multimedia content on the screen,
   wherein the terminal is configured to receive the encoding of the rendering from the server so that the desired portion of the multimedia content is accessed and displayed by the terminal, the encoding being transmitted by the server to the terminal using a Remote Frame Buffer protocol.

11. A method for displaying multimedia content on a screen of a multimedia terminal, the method comprising:
   receiving, by a server, a request from the multimedia terminal of a transmission of an encoding of a display of a desired portion of the multimedia content in a rendering format defined by the multimedia terminal, wherein the multimedia content is coded by data included in a file, stored on the server remote from said multimedia terminal, in a first format such that the entire file is required by an application that processes said first format to generate the display of said multimedia content on the multimedia terminal screen, said rendering format being different from said first format;
   selecting, by the server, a specific application that is compatible with the rendering format defined by the multimedia terminal from among a plurality of different applications associated with said server, in which each of said plurality of different applications is associated with a different rendering format;
   processing, by the server, the file with said specific application to generate the rendering encoding of said multimedia content according to the rendering format defined by the multimedia terminal, in which said rendering format defined by the multimedia terminal enables the display of only the desired portion of said multimedia content on the multimedia terminal screen without requiring a transmission from said server to said multimedia terminal of the entire file coding said multimedia content, and
   transmitting, by the server, the encoding of the rendering to the multimedia terminal using a Remote Frame Buffer protocol so that said only the desired portion of the multimedia content is accessed and displayed by the multimedia terminal.

12. A method for displaying multimedia content on a screen of a multimedia terminal, the multimedia content being coded by data included in a file stored on a server remote from the multimedia terminal in a first format such that the entire file is required by an application that processes said first format to generate a display of said multimedia content on the multimedia terminal screen, the method comprising:
   receiving, by the server, a request from the multimedia terminal to transmit an encoding of a display of a desired portion of the multimedia content in a rendering format defined by the multimedia terminal that is different from the first format, the rendering format defined by the multimedia terminal configured to provide the display of only the desired portion of the multimedia content on the multimedia terminal screen without requiring transmission from the server to the multimedia terminal of the entire file coding the multimedia content;
   selecting, by the server, a specific application that is compatible with the rendering format defined by the multimedia terminal from among a plurality of different applications associated with the server that provide different rendering formats;
   processing, by the server, the file with the specific application to generate the rendering encoding of the multimedia content according to the rendering format defined by the multimedia terminal to display only the desired portion of the multimedia content, the processing including generating position data that encodes a position for display of the multimedia content on the multimedia terminal screen and generating multimedia data that encodes the multimedia content; and
   transmitting, by the server, the encoding of the rendering to the multimedia terminal using a Remote Frame Buffer protocol so that said only the desired portion of the multimedia content is displayed by the multimedia terminal in accordance with the rendering format defined by the multimedia terminal,
   wherein the transmission of the encoding of the rendering by the server to the multimedia terminal includes processing the generated position data to inhibit the transmission of the multimedia data.

13. The method according to claim 12, wherein the multimedia content is video content, the position data encodes a position for display of the video content on the multimedia terminal screen and the multimedia data encodes images forming the video content according to the defined rendering format of the multimedia terminal.

14. The method according to claim 13, wherein the position data and the multimedia data are generated from a same memory storing the rendering encoding of multimedia content generated by the server according to matrix encoding.

15. The method according to claim 12, comprising displaying, by the multimedia terminal, command buttons on a screen and associating a command of such a button with a transmission of a command to the server intended to control the use of the file by the server.

16. The method according to claim 12, wherein the defined rendering format determines a size of the rendering dictated by the multimedia terminal on the multimedia terminal screen of the multimedia content.

* * * * *